United States Patent
Smith

[11] Patent Number: 5,816,624
[45] Date of Patent: Oct. 6, 1998

[54] HOSE END CONDUIT SWIVEL CONNECTOR

[76] Inventor: Walter W. Smith, 1299 Lawrence Dr., Newbury Park, Calif. 91320

[21] Appl. No.: 766,631

[22] Filed: Dec. 13, 1996

[51] Int. Cl.$^6$ ................................................. F16L 27/00
[52] U.S. Cl. ........................................ 285/276; 285/281
[58] Field of Search .................................. 285/276, 279, 285/281, 375

[56] References Cited

U.S. PATENT DOCUMENTS

| | | | |
|---|---|---|---|
| 1,366,634 | 1/1921 | Clark | 285/276 |
| 3,460,857 | 8/1969 | Larkin | 285/276 X |
| 3,889,983 | 6/1975 | Freize et al. | 285/276 X |

FOREIGN PATENT DOCUMENTS

| | | | |
|---|---|---|---|
| 990820 | 9/1951 | France | 285/281 |

Primary Examiner—Dave W. Arola
Attorney, Agent, or Firm—Richard D. Slehofer

[57] ABSTRACT

The hose end conduit swivel connector consists of a first conduit, adapted to be connected for example to a filler hose, and terminating in a bell-like housing within which resides a nipple with ball bearing rotation permitted between the two. Thus a pair of aligned conduits are provided with relative 360 degree rotation between the nipple and the housing. Leakage of fluid being transmitted through the connector is prevented by two sealing faces, one being located on a annular stationary seal member retained in the housing, which cooperates with a corresponding sealing face on an opposed rotating metallic seal. The sealing faces are carefully lapped so that leakage is substantially prevented from the interior of the conduits. A thrust plate and wave spring are interposed between the swivel connector and the nipple to cushion shock to the connector should the connector be accidently dropped or otherwise misused to prevent damage to the seals and the other components comprising the connector.

11 Claims, 5 Drawing Sheets

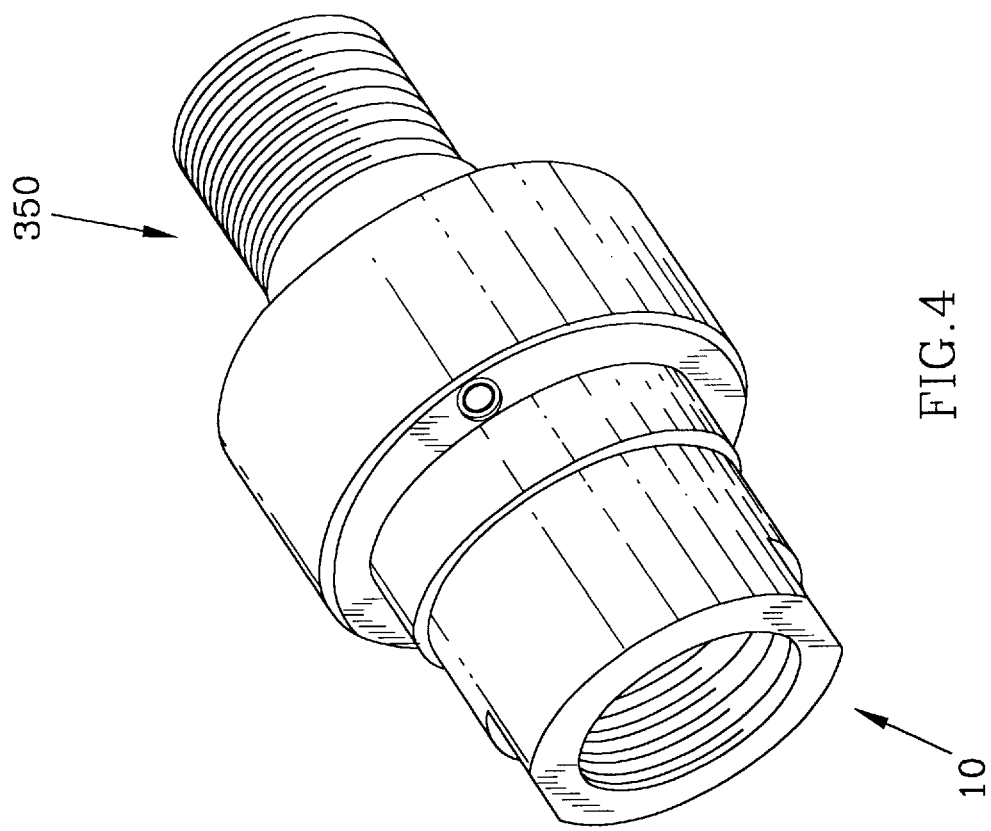
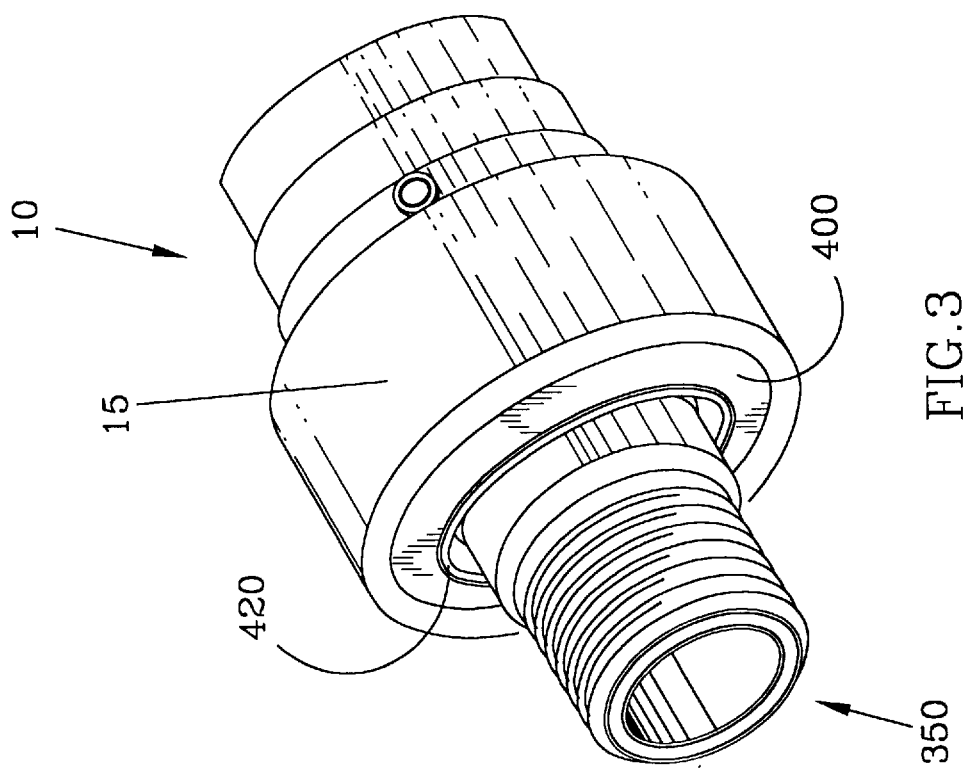

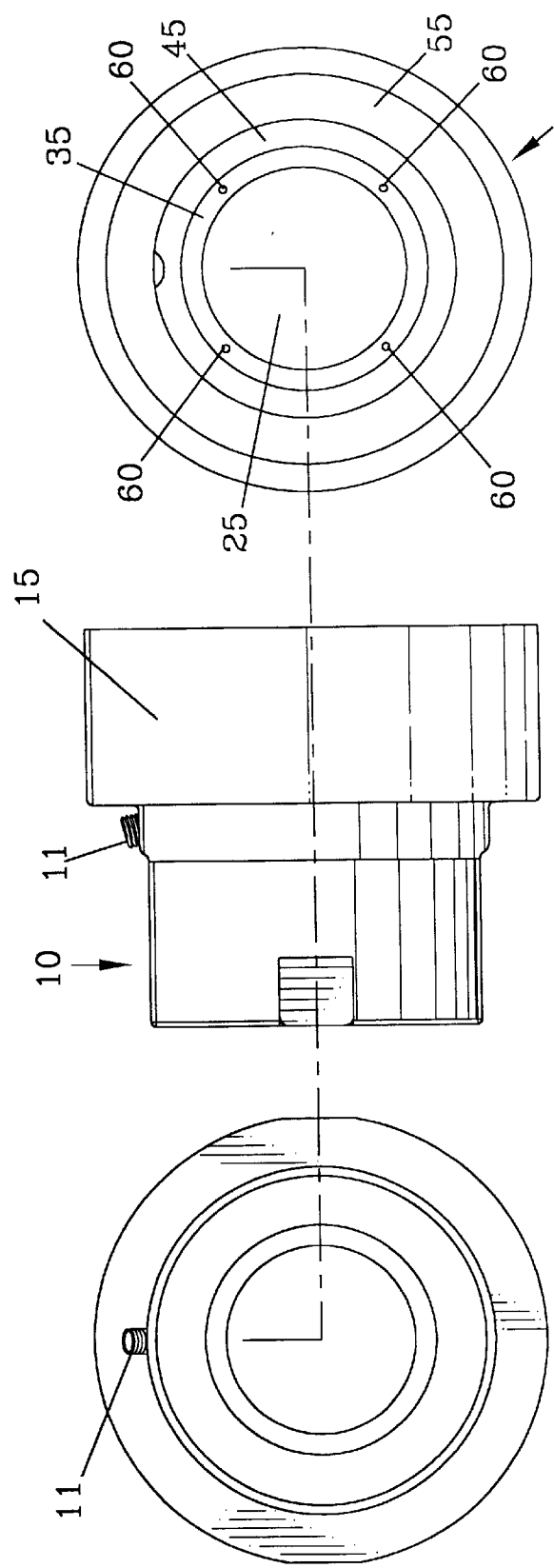
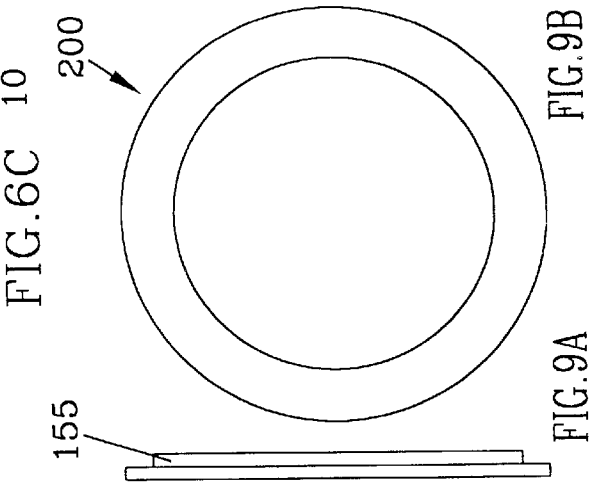
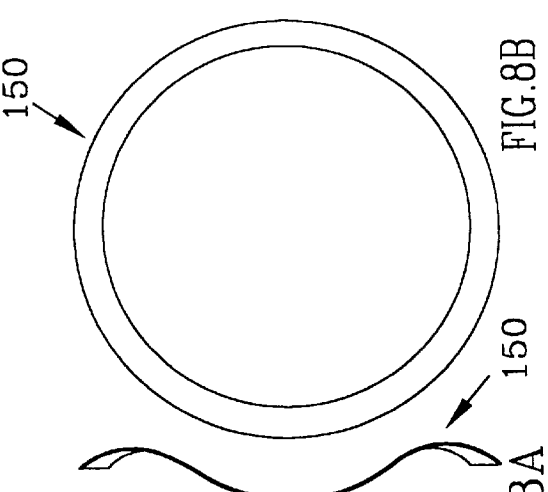
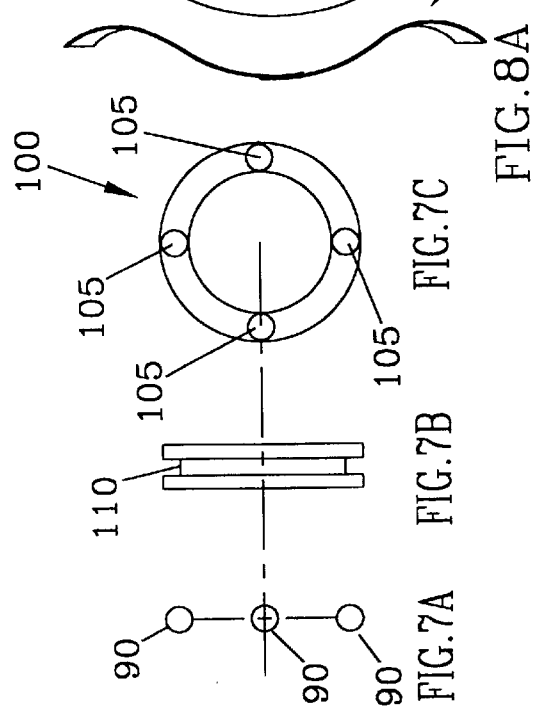

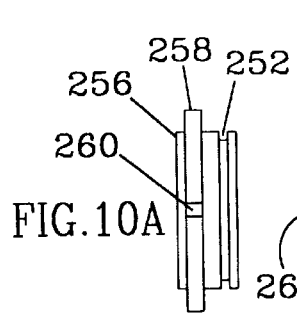
FIG.10A
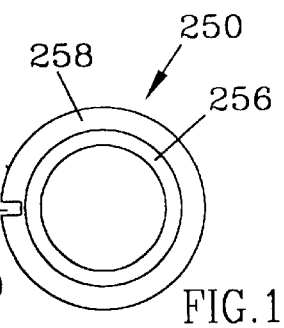
FIG.10B
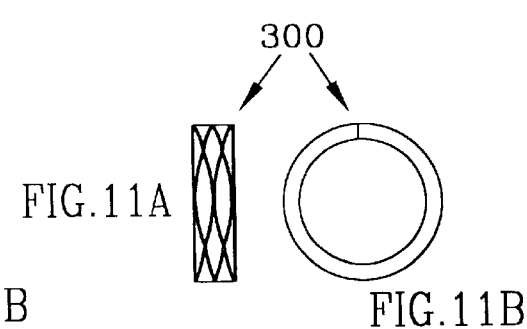
FIG.11A
FIG.11B
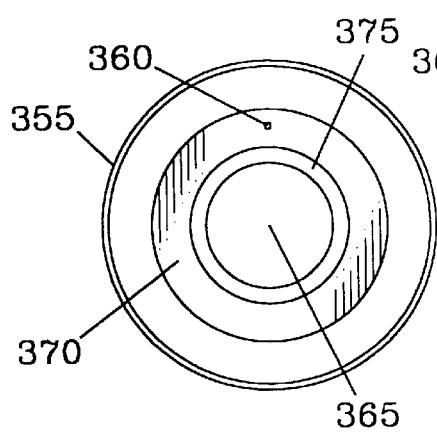
FIG.12A
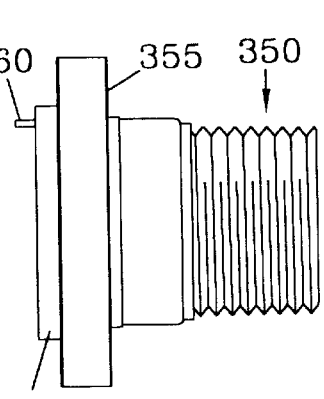
FIG.12B
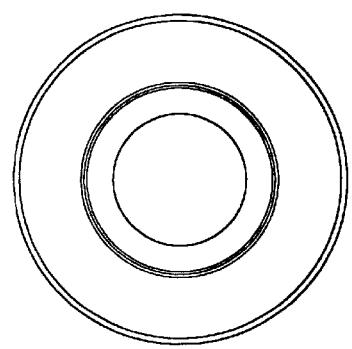
FIG.12C
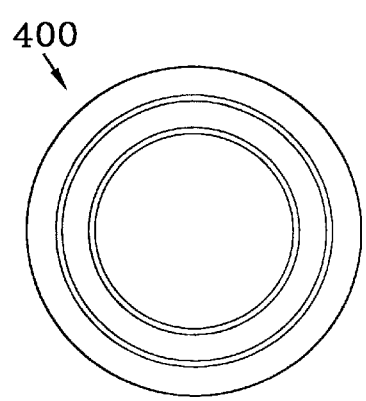
FIG.13A
FIG.13B
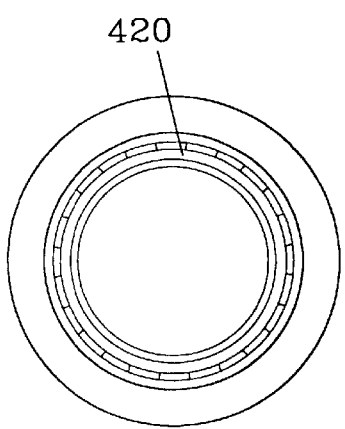
FIG.13C
FIG.14A
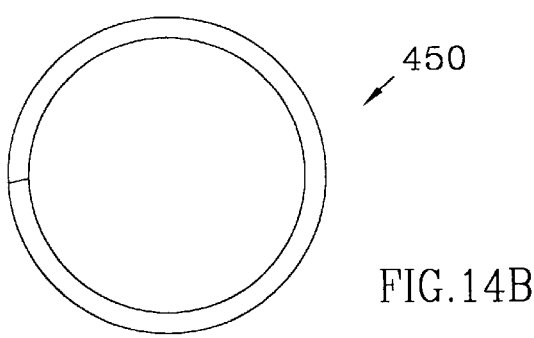
FIG.14B

HOSE END CONDUIT SWIVEL CONNECTOR

CROSS REFERENCE TO RELATED APPLICATIONS

This is a utility patent application based on applicant's provisional patent application serial number 60/008,551, which was filed on Dec. 18, 1995 and which is currently pending.

DESCRIPTION OF THE PRIOR ART

Applicant has an earlier issued U.S. Pat. No. 5,165,734 issued on Nov. 24, 1992 entitled Conduit Swivel Connector. The present application is an improvement over this patent.

BRIEF SUMMARY OF THE INVENTION

A connector or joint designed, for example, to connect an LP Gas filler hose to a delivery nozzle and permit swiveling between the delivery nozzle and the filler hose. The swivel connection enables complete full circle turning about the axis of the nozzle and the hose connection so as to obviate any twisting or kinking of the filler hose in use.

The connector is useful in liquefied petroleum gas (LPG) applications. Whenever an LPG tank has to be refilled, the LPG truck travels to the site of the stationary LPG tank. A flexible hose and nozzle have to be unreeled from the truck to the stationary tank. During the reeling and unreeling process, the hose twists and turns. The present invention is a linkage somewhere between the truck tank and the nozzle. The present invention allows the hose and other components to swivel back and forth or to rotate to prevent twisting and entanglement of the hose. Also, the present invention cannot allow any pressurized fluid to escape from it.

The present invention also has a unique feature, which includes a thrust plate and ball bearing pre-load spring positioned in the interior between the main housing and the rotatable nipple connection. The thrust plate cushions and absorbs the shock or an abrupt blow should the present invention be dropped on the ground by the delivery man or falls off the reel and is accidently dragged on the pavement behind the delivery truck. All are common occurrences in actual use.

BRIEF DESCRIPTION OF THE DRAWINGS

FIG. 3 is a perspective view of the present invention showing the external threaded nipple in the foreground.

FIG. 4 is a perspective view of the present invention showing the internal threaded end in the foreground.

FIG. 6A is the front view, FIG. 6B is a side view and FIG. 6C is an end view of the main housing, which is a component of the present invention.

FIG. 7 is a front and side elevational view of the stationary seal without the O-ring, along with a view of the retaining balls.

FIG. 8 is a front and side elevational view of the pre-load spring.

FIG. 9 is a front and side elevational view of the bearing thrust plate.

FIG. 10A is a front view and FIG. 10B is a side elevational view of the rotating metallic seal without the O-ring.

FIG. 11A is a front view and FIG. 11B is a side elevational view of the wave spring.

FIG. 12A is a front view, FIG. 12B is a side view, and FIG. 12C is an end elevational view of the combined ball bearings and rotatable nipple.

FIG. 13A is a front view, FIG. 13B is a side view, and FIG. 13C is an end elevational view of the bearing plate with lip seal and groove for O-ring.

FIG. 14A is a front view and FIG. 14B is a side elevational view of the spiral retaining ring.

DETAILED DESCRIPTION

Figure 2:
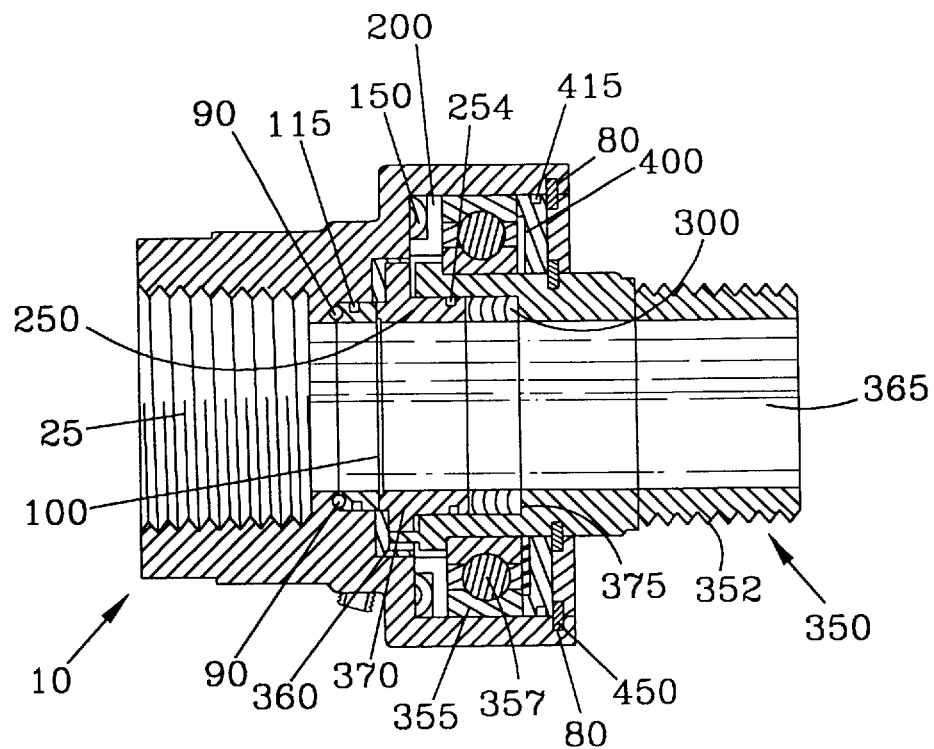
FIG. 2 is a longitudinal medial section of the present invention taken along the line 2—2 in FIG. 1.
Figure 1:
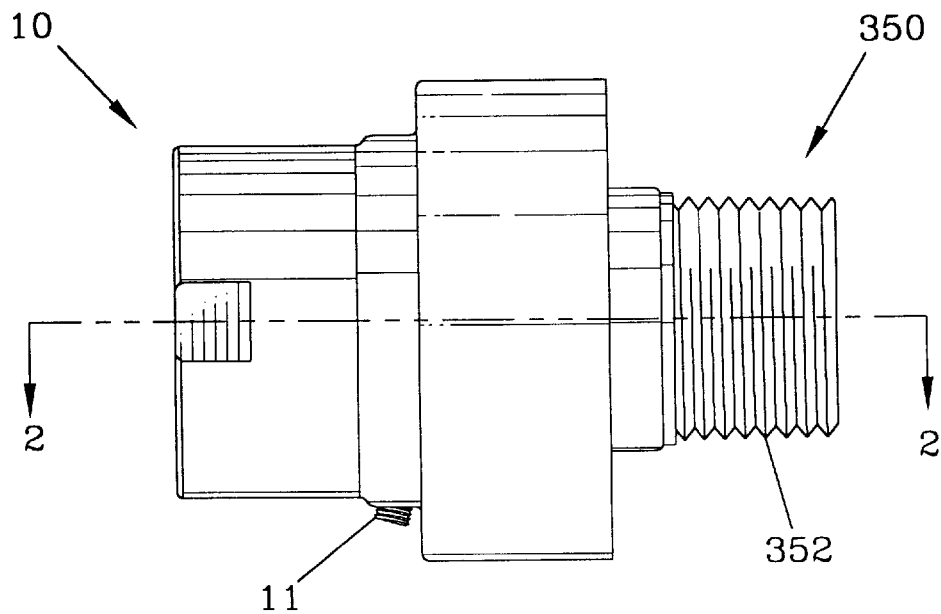
FIG. 1 is a side elevational view of the present invention.

The present invention includes nine major components. They are shown in correct sequence in the exploded perspective view in FIG. 5 and individually in the remaining Figures. The nine major components are; the main housing 10, the four individual balls 90, the annular stationary sealing member or seal ring 100, the ball bearing pre-load spring 150, the thrust plate 200, the rotatable metallic seal 250, the wave spring 300, the rotatable nipple 350 with ball bearing holder, the bearing retaining plate 400, and the spiral retaining spring 450. This is the correct sequence of the components from left to right after the present invention is assembled using the previously identified components.

The seal 250 will now be described and discussed in detail. The front and side views of the rotating metallic seal 250 are illustrated in FIGS. 10A and 10B. The seal 250 is provided with a circular groove 252 into which is fitted a sealing O-ring 254, which is not shown in FIGS. 5 or 10A, but which is shown in the medial longitudinal sectional view in FIG. 2 of the drawings. The O-ring blocks axial passage of fluid from the left end of the housing 10 (connected to the hose) into the interior of the housing. The left end of the seal 250 has a sealing face 256 and a flange 258 with a key way 260. The seal 250 is held stationary using the single key way pin 360 extending from the left end of the rotating nipple 350 which pin 360 is positioned in the key way 260 on the seal 250. The seal 250 is held stationary relative to the ball bearing 355. In this manner the metallic seal 250 is allowed to rotate relative to the ball bearing and holder 355. The diameter of the bore 262 passing through the seal 250 is of the same diameter as the bore 365 in the rotating nipple 350, which is about ⅞ inch. The seal 250 consists of a continuous-cast grey-iron seal. The face 256 of the seal is mated to the face of the seal ring 100 located in the main housing 10. The face 256 of the seal is lapped to three light bands. The face 256 of the seal is an annular ring or circular band about ⅛ inch in width. The keying arrangement of the key pin 360 and the key way 260 also allows the seal 250 limited axial movement relative to the other components that comprise the present invention.

Figure 5:
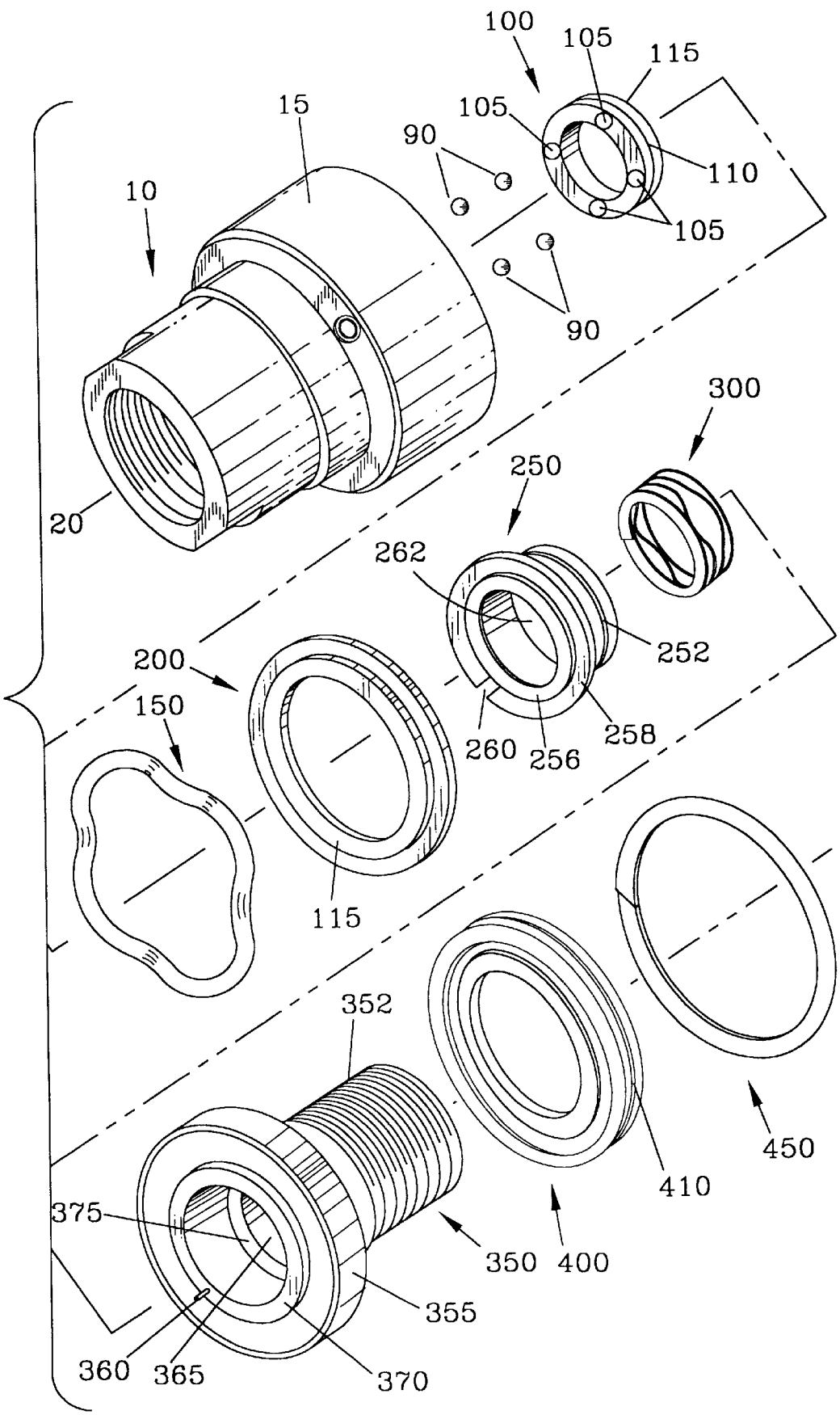
FIG. 5 is an exploded perspective view showing the components and the proper arrangement of the components which form the present invention.

The second conduit means comprising a rotating nipple 350 and a ball bearing holder 355 with internal ball bearings 357 is shown in the perspective view in FIG. 5. The left front, the side, and the right front of the nipple 350 are shown in FIGS. 12A, 12B and 12C repsectively. The nipple 350 and ball bearing 357 and the bearing holder 355 are independently rotatable relative to each other. They form one unit. The nipple has a left flange 370 from which extends the key pin 360 previously discussed. The bearing holder 355 is ring-shaped and fits around the outside of the nipple 350 and is permanently pressed against the right side of the flange 370 on the nipple 350 and around the outer wall of the nipple 350. The nipple 350 has an externally threaded right end portion 352 for threadably connecting to an LP gas delivery nozzle, which is not shown in any of the Figures. The nipple has a main annular bore 365 running therethrough. The left end of the main bore transitions to a larger stepped bore. The diameter of the main bore 365 is the same as the diameter of the annular bore 262 in the rotating seal 250. Both bores are in axial and concentric alignment. The transition between the main bore and the larger stepped bore results in an annular seat 375 or shoulder which can be seen in the left front view in FIG. 12A. The seat can also be seen in the sectional view in FIG. 2, and in the perspective view of the nipple 350 in FIG. 5. The seat 375 or shoulder acts as a stop for the wave or compression spring 300. The depth of the larger bore is about ½ inch. The thickness of the wave spring 300 in the uncompressed position is about ⅜ inch. The wave spring also has a bore therethrough of the same diameter as the main bore 365 in the nipple 350. The wave spring 300 is placed in the larger bore. The remaining space between the left face of the spring 300 and the flange 370 allows for the right hand portion of the body of the metallic seal 250 to be slidably positioned adjacent the left face of the spring 300. This arrangement can be seen in the sectional view in FIG. 2. The wave spring 300 allows limited axial movement of the metallic seal independently of the other components. The wave spring also maintains the sealing pressure between the two faces of the two seals 100 and 250. The wave spring 300 has the appearance of a miniature Slinky® toy. The wave spring has the appearance of a coiled flat ribbon of metal. The ribbon undulates like a wave to form the wave spring. The spring can be stretched apart as a Slinky® toy can be. It is also compressible to a limited extent. The wave spring 300 is compressed between the annular seat 275 and the metallic seal 250 to keep the latter continually biased to the left to maintain the sealing pressure between the two faces of the two seals 100 and 250.

The main housing 10 will now be described and discussed in detail. The housing 10 and the nipple 350 are both made of durable stainless steel. The present invention is corrosion-resistant. The housing 10 at its right hand end is bell-shaped, as shown at 15 in FIGS. 5 and 6. The bell-shaped portion 15 of the housing is used to encompass the left hand portion of the nipple 350 and to provide an annular space for the bearing holder 355, the ball bearing pre-load spring 150, the thrust plate 200, the bearing retaining plate 400, and the spiral retaining spring 450. The bell-shaped portion 15 with these components placed therein is illustrated in the sectional view in FIG. 2. The main housing 10 has five axial concentric stepped annular bores arranged in sequence. The left hand first bore 20 that terminates at the left end of the housing is female threaded for receiving the hose end of an LP gas hose. The threaded portion terminates at the right to a second small diameter bore 25 which is the same diameter as the main bore 365 in the nipple 350, the bore in the metallic seal 250, and the annular space in the wave spring 300. To the right of the small bore 25 is a somewhat larger diameter third bore 30 which acts as a seat for the stationary annular sealing member 100. The transition between the first small bore 25 and the second larger bore 30 results in a first annular shoulder 35, which is visible in the end view in FIG. 6. The next or fourth stepped bore 40 is a larger diameter than the seal seat bore 30. This fourth bore 40 is used for receiving the flange 258 end of the seal 250. The fourth bore 40 transition to the smaller third bore 35 results in a second annular shoulder 45, which is visible in the end view of the housing in FIG. 6C. The flange 258 of the metallic seal 250 mates with the second annular shoulder 45. The fifth stepped bore 50 is of much larger diameter than all of the other bores and is used as a seat for the ball bearing pre-load spring 150 and the face of the thrust plate 200. The fifth bore 50 transition to the smaller fourth bore 40 results in a third annular shoulder 55, which is visible in the housing end view in FIG. 6C. The large ball bearing pre-load spring 150 rests against the third annular shoulder 55. The overall diameter of the thrust plate 200 is the same as the overall diameter of the spring 150 and of the same the diameter of the fifth large bore 25. The thrust plate 200 is annular in shape and the width of the ring is the same as the width of the third shoulder 55. The left 5 side of the thrust plate 200 has a ring-shaped projection 155 so 6 that the spring 150 can fit around the projection 155 to keep the spring in place relative to the third annular shoulder 55 in the housing and the thrust plate 200. The spring 155 is a wave spring and compressible, and the combination spring 155 and thrust plate 200 serve a very important function in the present invention. After the components are assembled to form the present invention, the thrust plate abutting against the spring 150 in the housing allows the nipple 350, or male threaded portion of the present invention to absorb shock or an abrupt blow should the present invention be dropped on the ground while in use in actual field conditions where the present invention is used. The nipple 350 is allowed to move about 0.008-inch into the largest bore 50 of the main housing 10 before the thrust plate 200 bottoms out. In this way, the thrust plate cushions any abrupt blows and prevents damage to the seals and the other components in the present invention. The housing 10 also has a bleed screw 11 illustrated as an allen head screw. The screw can be unthreaded to release moisture or trapped fluid in the sealed housing, and then rethreaded to seal the interior of the present invention. The present invention can be serviced in the field with only a screwdriver if repairs are necessary.

The seal 100 will now be described and discussed in detail. The seal 100 is stationary in the sense it does not rotate relative to the main housing. The seal 100 is not keyed as the rotatable metallic seal 250 is keyed. The seal 100 is prevented from rotating in the seat by four small balls 90 that are equally spaced in the annular shoulder 35 in the main housing. The seat 35 of the second bore in the housing where the seal 100 is seated is an annular shoulder. Four hemispherical indentations 60 are drilled into the seat 35 and are equally spaced apart at 90 degree increments. The four hemispherical indentations are used for permanently holding each one of the bottom halves of the four balls 90. The annular stationary seal 100 has four complementary hemispherical indentations 105 for receiving each one of the top halves of the four balls 50. This spatial arrangement of the four balls 90, the seal 100 and the 4 indentations 105 is clearly illustrated in the perspective view in FIG. 5. The seal is slightly larger than the bore 30 into which it is seated. The seal is pressed into the bore and forms a tight fit. Also the face 256 of the metallic seal continuously presses against the face of the seal to prevent the seal 100 from dislodging or moving in its seat in the bore 30. The seal 100 is provided with a circular groove 110 into is fitted a sealing O-ring 115, which is not shown FIGS. 5 or 7, but which is shown in the medial sectional view in FIG. 2 of the drawings. The O-ring 115 is used to seal the exterior cylinder wall portion of the annular stationary seal 100 and is used to block axial passage of fluid from the left end of the housing 10 into the interior of the housing 10. The stationary seal ring 100 is made of a monomeric thermoplastic material. The sealing face 115 of the seal ring 100 is lapped to three light bands just as the sealing mating face 256 of the rotatable seal 250 is lapped to three light bands.

The bearing retaining plate 400 will now be described and discussed in detail. As shown in exploded perspective view 8, the plate has an annular shape. The front side and rear views of the plate 400 is shown in FIGS. 13A, 13B and 13C respectively. The plate is fitted over the nipple 350 and is positioned against the right hand face of the ball bearing holder 355. The plate is a one-piece metal ring. The plate 400 is provided with a circular groove 410 into which is fitted a sealing O-ring 415, which is not shown FIGS. 5 or 13, but which is shown in the medial sectional view in FIG. 2 of the drawings. The O-ring 415 is used to seal the exterior cylinder wall portion of the annular bearing plate 400 and is used to block axial passage of fluid from the left end of the housing 10 into the interior of the housing 10 and also to prevent contamination of soil and water from the exterior into the housing from the right end. An elastomeric annular seal 420 is fitted into the interior rim of the plate 400 for additional sealing.

The spiral retaining ring 450 will now be described and discussed in detail. Immediately interior of the end of the large bore in the housing is cut an internal circular groove 80. This is for receiving the spiral retaining ring 450. The thickness and outside diameter of the ring 450 are the same as the groove 80. After all of the eight major components are assembled together, the spiral ring is contracted and placed into the groove 80, and allowed to expand to near its normal shape, which causes it to lock itself in the groove 80, and in turn keeps the other components in place in the housing even though the wave spring 300 and the pre-load spring 150 are permanently biasing against the components placed together in the housing to expand. The retaining ring 450 prevents this. It also keeps the two sealing faces 256 and 115 in frictional sealing engagement with each other.

OPERATION

In use the left hand of the main housing 10 is secured to a flexible LP gas delivery hose, and a nozzle is threaded onto the right hand end of the nipple 350. In unreeling the hose there is a tendency for the hose to twist, which would kink and disrupt the filling operation were it not for the swivel connection between the nipple 350 and the main housing 10. With the swivel connection, however, such twisting is ameliorated and there is no disturbance to the filling operation.

In the filling operation the fluid under pressure flows freely through the internal diameter of the main housing, the annular stationary sealing member 100, the rotating metallic seal 250, into the inside diameter of the nipple 350 and thence into the filler nozzle. There is limited adjusting movement between the rotatable metallic seal 250 and the housing 10. There is virtually no leakage past the outside diameters of the stationary sealing member 100 and the rotating/rotatable metallic seal 250. As relative rotation between the nipple 350 and the housing 10 takes place there is a corresponding rotative sliding between the stationary sealing member annular sealing face 115 and the rotating metallic seal annular sealing face 256.

These sealing faces are carefully and precisely lapped so as to block leakage radially across the engaging faces.

Sealing pressure at the annular sealing faces 256 and 115 is provided by the wave spring 300, and the ball bearing pre load spring 150.

Obviously, many modifications and variants of the present invention are possible in light of the above teachings. It is therefore to be understood that the full scope of the invention is not limited to the details disclosed herein, but may be practiced otherwise than as specifically described.

I claim:
1. Hose end conduit swivel connector comprising:
    a main housing having adjacent small, medium and large diameter stepped bores and an opposed internal threaded bore;
    a stationary seal positioned in said small bore in said housing and having an annular sealing face;
    a nipple coaxial with said main housing and having a small diameter bore and an adjacent medium diameter stepped bore;
    a compression spring positioned in said medium stepped bore of said nipple;
    a rotatable metallic seal having a planar annular sealing face in contiguous sealing engagement with said stationary sealing face and an annular body portion opposite to said annular sealing face abutting said compression spring in said medium bore in said nipple;
    pin means on said interior face of said nipple and said rotatable seal for causing said nipple and said rotatable seal to rotate as a unit and to allow limited axial movement of said rotating metallic seal relative to said nipple after the conduit swivel connector is assembled;
    bearing means disposed coaxially between said main housing and said nipple for enabling relative rotation between said main housing and said nipple about the common axis of said housing and said nipple; and
    said stationary seal and said rotatable seal being in continuous sealing engagement, and being allowed to rotate even under frictional engagement.
2. The hose end conduit connector as recited in claim 1 further comprising:
    a large diameter compression spring positioned in said large diameter stepped bore in said housing;
    a thrust plate placed adjacent said large diameter compression spring and interposed between said main housing and said nipple for allowing limited axial movement between said nipple and said housing to cushion the shock whenever said hose end swivel connector is dropped or otherwise misused.
3. The hose end conduit connector as recited in claim 2 wherein said large diameter compression spring positioned in said large bore in said housing comprises a wave spring.
4. The hose end conduit connector as recited in claim 1 wherein said compression spring positioned in said nipple comprises a wave spring.
5. The hose end conduit connector as recited in claim 1 wherein said pin means on said nipple and said rotatable seal comprises:
    key way pin on said nipple;
    key way on said rotatable seal receiving said key way pin;
    said key way pin in said key way on said rotatable seal allows for limited axial movement of said seal and yet causes said nipple and said rotatable seal to rotate as a unit.
6. The hose end conduit connector as recited in claim 1 wherein said stationary seal is comprised of a monomeric thermoplastic.
7. The hose end conduit connector as recited in claim 1 wherein said rotatable seal is comprised of a continuous-cast grey iron.
8. The hose end conduit connector as recited in claim 1 wherein said main housing and said nipple are comprised of corrosion resistant stainless steel.
9. The hose end conduit connector as recited in claim 1 wherein said main housing forms a bell-shaped portion for receiving said bearing means on said nipple;

said bearing means includes ball bearings with a holder mounted on said nipple.

10. The hose end conduit connector as recited in claim 9:

a bearing retaining plate positioned adjacent said ball bearing holder; and spiral retaining spring positioned in the end of the bell-shaped portion on said housing.

11. Hose end conduit swivel connector comprising:

a main housing;

a stationary seal positioned in said housing and having an annular sealing face;

a nipple coaxial with said main housing;

a compression spring positioned in said nipple;

a rotatable seal having a planar annular sealing face in contiguous sealing engagement with said stationary sealing face and an annular body portion opposite to said annular sealing face for positioning against said compression spring in said nipple;

bearing means disposed coaxially between said main housing and said nipple for enabling relative rotation between said main housing and said nipple about the common axis of said housing and said nipple;

a large diameter compression spring positioned in said main housing;

a thrust plate placed adjacent said large diameter compression spring and interposed between said main housing and said nipple for allowing limited axial movement between said nipple and said housing to cushion the shock whenever a said hose end swivel connector is dropped or otherwise misused.

* * * * *